US006734796B2

(12) United States Patent
Forster et al.

(10) Patent No.: US 6,734,796 B2
(45) Date of Patent: May 11, 2004

(54) SELF-CHECK FOR A DETECTOR DETECTING THE PROXIMITY OF A TRANSPORTATION VESSEL

(76) Inventors: Ian J. Forster, 31 Great Cobb, Springfield, Chelmsford (GB), CM1 6LA; Peter Robert George Horrell, 22 Rothesay Avenue, Chelmsford (GB), CM2 9BU; David J. Puleston, 4184 Nobelman Point, Duluth, GA (US) 30097

( * ) Notice: Subject to any disclaimer, the term of this patent is extended or adjusted under 35 U.S.C. 154(b) by 0 days.

(21) Appl. No.: 10/160,512

(22) Filed: Jun. 3, 2002

(65) Prior Publication Data

US 2003/0006900 A1 Jan. 9, 2003

Related U.S. Application Data

(63) Continuation-in-part of application No. 09/898,498, filed on Jul. 3, 2001, which is a continuation-in-part of application No. 09/542,772, filed on Apr. 4, 2000, now Pat. No. 6,281,797.

(51) Int. Cl.[7] .............................................. G08B 13/14
(52) U.S. Cl. ................................ 340/572.3; 340/572.1; 340/572.8; 340/988; 340/438; 340/825.49; 340/10.5; 340/10.51; 340/10.36
(58) Field of Search .......................... 340/572.3, 572.1, 340/572.8, 988, 438, 825–49, 10.5, 10.51, 10.36, 514, 515; 375/376; 327/150, 155, 159

(56) References Cited

U.S. PATENT DOCUMENTS 3,418,574 A 12/1968 Wyckoff ....................... 324/77

4,219,740 A 8/1980 Little .......................... 307/116
4,532,501 A * 7/1985 Hoffman ..................... 340/679
4,688,244 A 8/1987 Hannon et al. ............... 379/58

(List continued on next page.)

FOREIGN PATENT DOCUMENTS

| DE | 19832633 | 1/2000 |
| EP | 0984418 | 3/2000 |
| WO | WO 97/22049 | 6/1997 |

OTHER PUBLICATIONS

"TLC Net–Tracker", 1 page, http://www.tlcnetwork.com, Jun. 9, 2000.
"Snowflake Code", 2 pages, http://www.marconidata.com, Mar. 27, 2000.

Primary Examiner—Daniel J. Wu
Assistant Examiner—Tai T. Nguyen

(57) ABSTRACT

A frequency detector that detects a frequency signal indicative of the proximity of a transportation vessel or an intrinsically-safe area. The frequency detector may be associated with any type of electronic device. The frequency detector detects the presence of a frequency signal that is emitted by a transportation vessel and/or a frequency beacon associated with the transportation vessel. The frequency detector and/or container may disable, shut down, or reduce power of any electro-magnetic field generating devices associated with the frequency detector and/or container if the frequency detector receives a frequency signal indicative of the inside or proximity of a transportation vessel or an intrinsically-safe area. The container also includes a self-check frequency generator that emits a frequency signal capable of being detected by the frequency detector. If the frequency detector is operating properly, the frequency detector will successfully receive the frequency signal emitted by the frequency generator.

76 Claims, 10 Drawing Sheets

U.S. PATENT DOCUMENTS

| | | | |
|---|---|---|---|
| 4,779,240 A | 10/1988 | Dorr | 367/96 |
| 5,003,824 A | 4/1991 | Fukada et al. | 73/651 |
| 5,033,034 A | 7/1991 | Paradise | 367/124 |
| 5,165,064 A | 11/1992 | Mattaboni | 356/152 |
| 5,210,521 A * | 5/1993 | Hojell et al. | 340/436 |
| 5,224,029 A | 6/1993 | Newman, Jr. | 363/48 |
| 5,565,858 A | 10/1996 | Guthrie | 340/825.35 |
| 5,648,763 A | 7/1997 | Long | 340/825.49 |
| 5,739,754 A * | 4/1998 | Schrott et al. | 340/572.2 |
| 5,764,145 A * | 6/1998 | Hansson et al. | 340/562 |
| 5,782,275 A | 7/1998 | Hartsell, Jr. et al. | 141/94 |
| 5,815,407 A | 9/1998 | Huffman et al. | 364/492 |
| 5,825,283 A | 10/1998 | Camhi | 340/438 |
| 5,835,322 A | 11/1998 | Smith et al. | 361/45 |
| 5,838,238 A * | 11/1998 | Abita et al. | 340/573.1 |
| 5,894,323 A | 4/1999 | Kain et al. | 348/116 |
| 5,915,210 A | 6/1999 | Cameron et al. | 455/59 |
| 5,991,614 A | 11/1999 | Oura | 455/404 |
| 6,023,244 A | 2/2000 | Snygg et al. | 343/700 |
| 6,031,488 A | 2/2000 | Hua et al. | 342/357.12 |
| 6,122,486 A | 9/2000 | Tanaka et al. | 455/68 |
| 6,448,906 B1 * | 9/2002 | Nachtsheim et al. | 340/945 |

* cited by examiner

SELF-CHECK FOR A DETECTOR DETECTING THE PROXIMITY OF A TRANSPORTATION VESSEL

RELATED APPLICATION

This application is a continuation-in-part application of pending patent application Ser. No. 09/898,498, entitled "Deactivation of field-emitting electronic device upon detection of a transportation vessel," filed on Jul. 3, 2001, which is a continuation-in-part application of pending patent application Ser. No. 09/542,772, now issued U.S. Pat. No. 6,281,797, entitled "Method and apparatus for detecting a container proximate to a transportation vessel hold," filed on Apr. 4, 2000. The present patent application claims benefit of priority to both U.S. Pat. No. 6,281,797 and pending patent application Ser. No. 09/898,498.

FIELD OF THE INVENTION

The present invention is directed to a self-checking system for a frequency detector that is adapted to detect the proximity of a transportation vessel, such as an aircraft transportation vessel, or an intrinsically-safe area.

BACKGROUND OF THE INVENTION

It may be desirable for certain electronic devices to be deactivated when on board or in proximity to a transportation vessel or in proximity to an intrinsically-safe area. For example, the United States Federal Aviation Administration (FAA) places restrictions on use of certain electronic devices on an aircraft during its operation. These electronic devices may emit electromagnetic fields that could potentially interfere with the aircraft systems, such as its navigation and/or communication systems. Some electronic devices may emit fields during their operation, but do not include transmission communication systems, such as a laptop computer for example. These devices are permitted for use on an aircraft after the aircraft reaches an altitude of ten thousand feet. Other electronic devices that emit fields during communication, such as cellular phones, are not permitted for use on an aircraft at anytime during flight. In addition, the electronic device and/or fields emitted by the electronic devices may cause an unsafe condition if operational in an intrinsically-safe area.

Aircraft do not include automatic detection systems that are capable of detecting when an electronic device having a field-emitting device is being used on the aircraft. Airlines must rely on a flight attendant's visual inspection to ensure that passengers are not using electronic devices in an improper manner. Therefore, there exists a possibility that a passenger may use a field-emitting electronic device while on-board an aircraft that goes undetected by the flight attendants and that may cause interference with the aircraft systems in an unsafe manner. Electronic devices may also cause undesired interference with other types of transportation vessels, in addition to aircraft, if such electronic devices are not deactivated or disabled.

In addition, many shipping companies attach tracking devices having a field-emitting communication systems (also known as "tracking devices") to shipping containers to track their geographic location. This allows the shipping company to determine the geographic location of the container as it moves between the origination and destination points to determine whether the goods inside the container are on time, late, or somehow misplaced. For instance, the container may have been misrouted or been placed on the incorrect transportation vessel to reach its destination. The advantages of tracking the position of containers and their associated goods are many and, therefore, such tracking has become commonplace throughout the shipping industry.

A problem occurs when a container having such a tracking device is loaded onto a transportation vessel, such as by ground crew onto an aircraft transportation vessel. The signals emitted by the tracking device may potentially cause interference with the aircraft transportation vessel's systems. Again, the FAA places restrictions on communication signals, such as those generated by a tracking device, due to their potential interference with flight systems and communications. It may be inadequate to rely on a person to manually switch off the tracking device and/or field-emitting device when entering into the proximity of a transportation vessel or an intrinsically-safe area. For example, human operators and/or ground crew may forget to deactivate the tracking device and/or field-emitting device.

Before the present invention, field-emitting electronic devices, including tracking devices, must be manually deactivated before being loaded onto vessels, such as aircraft transportation vessels, because of this potential interference. To eliminate the possibility of human error, it is necessary that the electronic device and/or tracking device be automatically deactivated so that its signals do not interfere with a transportation vessel while a container associated with the tracking device and/or field-emitting device is proximate to or on board the transportation vessel. The related applications to the present invention, Pending patent application Ser. No. 09/898,498, entitled "Deactivation of field-emitting electronic device upon detection of a transportation vessel," filed on Jul. 3, 2001, which is a continuation-in-part application of Pending patent application Ser. No. 09/542,772, now issued U.S. Pat. No. 6,281,797, entitled "Method and apparatus for detecting a container proximate to a transportation vessel hold," filed on Apr. 4, 2000, disclose several embodiments that use detection of frequency signals to indicate the proximity of a transportation vessel and thereafter automatically deactivate a field-emitting device and/or a tracking device associated with an electronic device and/or a container. However, a problem may occur if the frequency detector fails to operate properly and detect a transportation vessel due to a malfunction or other error. If the frequency detector fails, the field-emitting device and/or the container will not deactivate its field-emitting and/or tracking device systems, thereby potentially interfering with the transportation vessel systems.

Therefore, a need exists to provide a self-checking feature to determine if a frequency detector that is used to detect the proximity of a transportation vessel is operating properly so that electronic field-emitting and/or tracking devices do not interfere with the transportation vessel's systems.

SUMMARY OF THE INVENTION

The present invention is directed to an electronic field-emitting device that detects the proximity of a transportation vessel and/or intrinsically-safe area. The electronic device may interfere with the transportation vessel systems and/or be unsafe if operational in an intrinsically-safe area. The electronic device, being either a field-emitting device or a tracking device, is capable of deactivating and/or decoupling power from the electronic device and/or its subsystems when the transportation vessel or an intrinsically-safe area is detected so that the field-emitting device does not interfere with the transportation vessel or the intrinsically-safe area. The term "electronic device" is used in this entire summary, description of the invention, and claims to refer to a field-emitting device and/or a tracking device, and use of the term "electronic device" includes a field-emitting device and/or a tracking device.

The electronic device may be any type of electronic device that emits an electrical, magnetic, or electromagnetic field. The field may be generated during communications, or may be generated during the normal operation of the electronic device. One embodiment of an electronic device that generates a field as a result of communication is a cellular phone. Other embodiments of electronic devices that generate a field typically relating to subsystems that do not involve transmission communication include a laptop computer and personal digital assistant (PDA) device. The electronic device contains a frequency detector to determine if the electronic device is proximate to, being loaded into, or is already loaded into a transportation vessel (hereinafter collectively referred to as "proximate" or "in proximity to") so that the tracking device can be deactivated so as to not interfere with the communication systems of the transportation vessel.

In another embodiment, the electronic device is a tracking device associated with a container. The tracking device receives information regarding the location of the container, and such location information is communicated remotely for tracking purposes. A frequency detector associated with a container is provided to determine if the container is in proximity to a transportation vessel so that the tracking device can be deactivated so as to not interfere with the communication systems of the transportation vessel.

The transportation vessel may emit particular frequencies that are representative of the operation of the vessel. A frequency detector is coupled to a control system in the electronic device. A frequency generator is coupled to the frequency detector and to the control system as a self-checking device. The control system causes the frequency generator to emit a frequency signal to be picked up by the frequency detector to determine if the frequency detector is operating properly.

In another embodiment, the frequency detector is used to detect frequency signals to signify that an electronic device is in proximity to a transportation vessel. Markers, also called "frequency beacons," emit specific frequency signals detectable by the frequency detector and are placed in or proximate to the transportation vessel. The frequency detector detects the frequency signals emitted by the frequency beacon(s) that are indicative of the proximity of a transportation vessel, and the frequency signal is passed to the control system for deactivation purposes.

In all embodiments, the control system may periodically cause the frequency generator to emit a frequency signal to check the operation of the frequency detector. The frequency generator is designed to emit substantially the same frequency signal as designed as the representative frequency that is to be detected by the frequency detector. The control system may use a timer that is either polled or that causes an interrupt at the control system. The control system may also check the proper operation of the frequency detector using the frequency generator if a frequency signal is no longer detected by the frequency detector. In this manner, the control system can reactivate the electronic device if the electronic device is not in proximity to the transportation vessel.

The control system can deactivate the system in varying degrees. The control system may include a remote communication device that is used to communicate information from the electronic device to a remote system. The remote communication device can be deactivated so that transmissions are not made while the electronic device is in proximity to a transportation vessel. Other systems may be deactivated in the electronic device based on the frequency signal detected by the frequency detector to conserve power and to further diminish potential interference with the transportation vessel's systems.

DETAILED DESCRIPTION OF THE INVENTION

Figure 1:
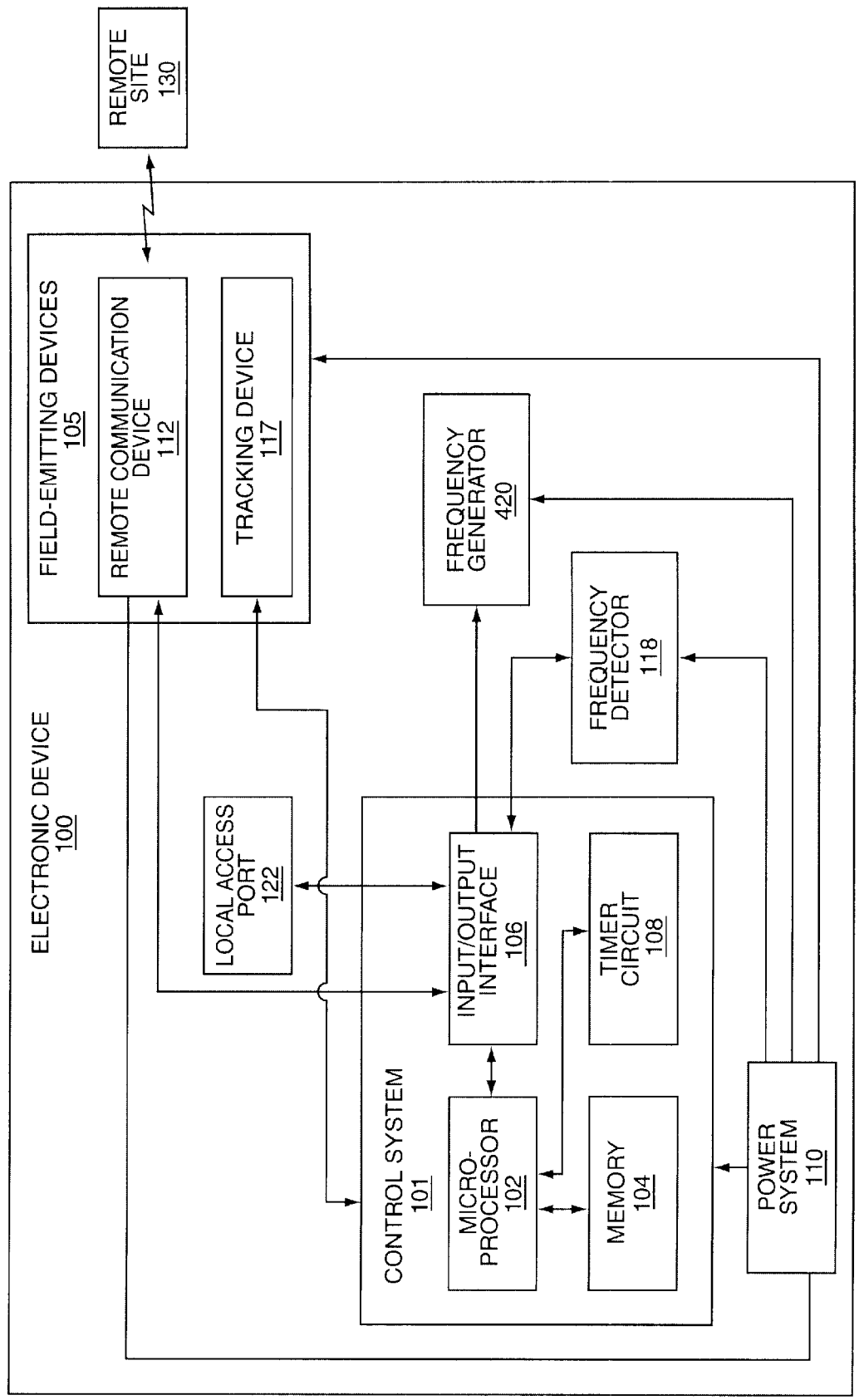
FIG. 1 is a schematic illustration of the components of the electronic device and frequency detection system according to the present invention.

The following invention is a continuation-in-part application of Pending patent application Ser. No. 09/898,498, entitled "Deactivation of field-emitting electronic device upon detection of a transportation vessel," filed on Jul. 3, 2001, which is a continuation-in-part application of Pending patent application Ser. No. 09/542,772, now issued U.S. Pat. No. 6,281,797, entitled "Method and apparatus for detecting a container proximate to a transportation vessel hold," filed on Apr. 4, 2000, which are both incorporated herein by reference in their entirety. The present patent application claims benefit of priority to both U.S. Pat. No. 6,281,797 and Pending patent application Ser. No. 09/898,498. Referring now to the drawings in general, it will be understood that the illustrations are for the purpose of describing preferred embodiments of the invention and are not intended to limit the invention thereto.

Before discussing the frequency detector self-checking aspects of the present invention, described below and illustrated in FIGS. 8–10, a description of the electronic device and illustrative examples of the electronic device are described first.

FIG. 1 schematically illustrates an electronic device 100 according to one embodiment of the present invention. "Electronic device" 100 is defined as any device that emits or generates an electric, magnetic, or electro-magnetic field. The electronic device 100 includes a control system 101 that includes a microprocessor 102 operatively connected with a memory 104, an input/output interface 106, and a timer circuit 108. The microprocessor 102 interfaces with devices outside the control system 101 through the input/output interface 106. If the microprocessor 102 needs to carry out instructions or operations based on time, the microprocessor 102 uses the timer circuit 108.

The electronic device 100 may also contain a field-emitting device 105 within. One example of a field-emitting device 105 is a tracking device 117, also referred to as a positioning system 117 or a global positioning system (GPS) receiver 117. These terms are used interchangeably herein. The GPS receiver 117 receives electronic signals containing positioning information representing the location of the electronic device 100. One example of the positioning system 117 is described in U.S. Pat. No. 5,648,763, entitled "Method and apparatus for global position responsive security system," incorporated herein by reference in its entirety.

The positioning information is received by the microprocessor 102 through the input/output interface 106. The microprocessor 102 may store the positioning information in memory 104. The microprocessor 102 may also send the positioning information received from the tracking system 117 concerning the location of the electronic device 100 to a remote communication device 112 via the input/output interface 106, which may also be a field-emitting device 105 since the remote communication device 112 may transmit information using wireless and/or radio communications. The remote communication device 112 is designed to communicate the positioning information to a remote site 130 or other type of host computer. The remote communication device 112 may transmit positioning information by a wired communication, such as a telephone modem, or it may transmit such information wirelessly through use of a cellular phone modem. Alternatively, the remote communication device 112 may send out positioning information to the remote site 130 in the form of frequency communication signals to devices such as satellites or radio-frequency devices.

A power system 110 supplies power to the electronic device 100, the control system 101, the field-emitting device(s) 105 and other components in or associated with the electronic device 100 for executing the tracking functions. The power system 110 is coupled to the electronic device 100 so that field-emitting device 105 functions can operate regardless of whether the electronic device 100 is in the presence of an external power source. However, the power system 110 may also be connected to external power as well. The microprocessor 102 controls which devices within and/or associated with the electronic device 100 receive power by controlling the distribution of the power system 110.

The electronic device 100 also includes a local access port 122. A computing device, such as a laptop computer with the proper software, can access the electronic device 100 electronically by connecting to the local access port 122, for reasons described below.

A frequency detector 118 is utilized to determine the proximity of a transportation vessel to deactivate the electronic device 100 and/or other field-emitting device(s) 105 associated with the electronic device 100. The frequency detector 118 is designed to detect a frequency signal indicative of the proximity of a transportation vessel. The frequency signal may be emitted by a transportation vessel as a normal byproduct of its operation, such as signals emitted from communication systems for example, or the frequency signal may be emitted by a frequency beacon 120 contained inside or in proximity to a transportation vessel.

The frequency detector 118 may also be used by the electronic device 100 to determine when the electronic device 100 enters an intrinsically-safe area. If the electronic device 100 is prohibited from entering areas that require intrinsic safety, this could restrict routes available for the electronic device's 100 travel and may further restrict the utility of the electronic device 100 for any purpose, including shipping applications. The frequency beacon 120 may be placed in an area that is designated as an intrinsically-safe area so that the electronic device 100 is capable of detecting the intrinsically-safe area and deactivating or decoupling from power any of its associated components, including but not limited to its field-emitting device(s) 105.

Section 500-2 of the National Electrical Code Handbook (NEC), incorporated herein by reference in its entirety, indicates that "intrinsically safe" equipment is electrical equipment that "operates at a low voltage and are designed safe, regardless of short circuits, ground, over-voltage, equipment damage, or component failure." A wide range of industries such as, for example, electric utilities, power plants, oil refineries, off shore oil rigs, gas ethylene companies, chemical plants, coal mining operations, coal prep plants and transfer stations, gas pipelines, plastic manufacturers, granaries, etc. present very hazardous environments in which electrical equipment must be used. Because of these dangerous environments, various standards have been imposed by the NEC and by Underwriters Laboratories (UL) for the design of electrical equipment for hazardous areas.

Figure 2C:
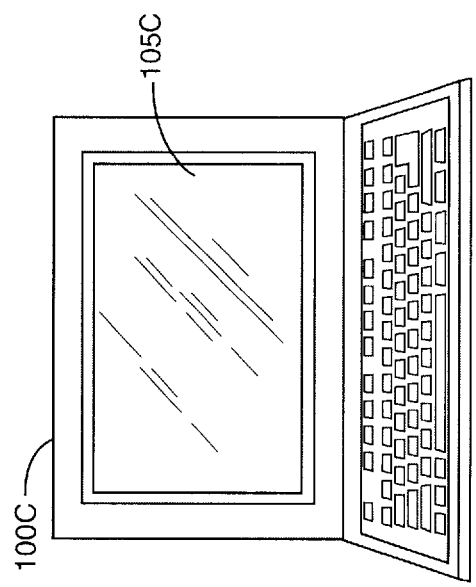
FIG. 2C is a schematic diagram of a laptop computer field-emitting device that may be used in accordance with the present invention.
Figure 2B:
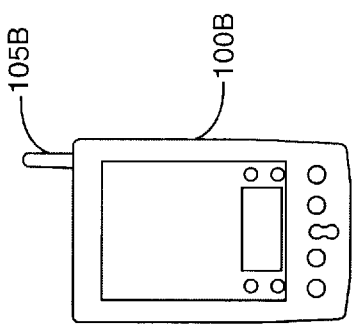
FIG. 2B is a schematic diagram of a personal digital assistant (PDA) field-emitting device that may be used in accordance with the present invention.
Figure 2A:
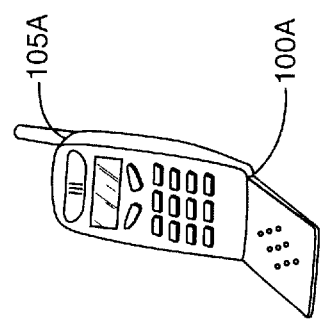
FIG. 2A is a schematic diagram of a cellular phone field-emitting device that may used in accordance with the present invention.

By way of example, FIGS. 2A, 2B and 2C illustrate examples of electronic devices 100 that contain a field-emitting device 105 and which may be used with the present invention. FIG. 2A is an illustration of a typical cellular phone 100A. The cellular phone 100A contains a field-emitting device 105A, in the form of communication electronics, that communicates data in the form of radio-frequency signals. FIG. 2B is an illustration of a typical personal digital assistant 100B that includes a field-emitting device 105B in the form of a radio-frequency transmitter/receiver. FIG. 2C is an illustration of a typical laptop computer 100C that includes a field-emitting device 105C in the form of a monitor display. All of the aforementioned electronic devices 100A, 100B, 100C, respectively, contain field-emitting devices 105A, 105B, 105C that may be used with the present invention and include a control system 101 similar to that illustrated in FIG. 1 to deactivate their respective field-emitting devices 105A, 105B, 105C and/or other systems upon detection of the proximity of a transportation vessel.

Figure 3:
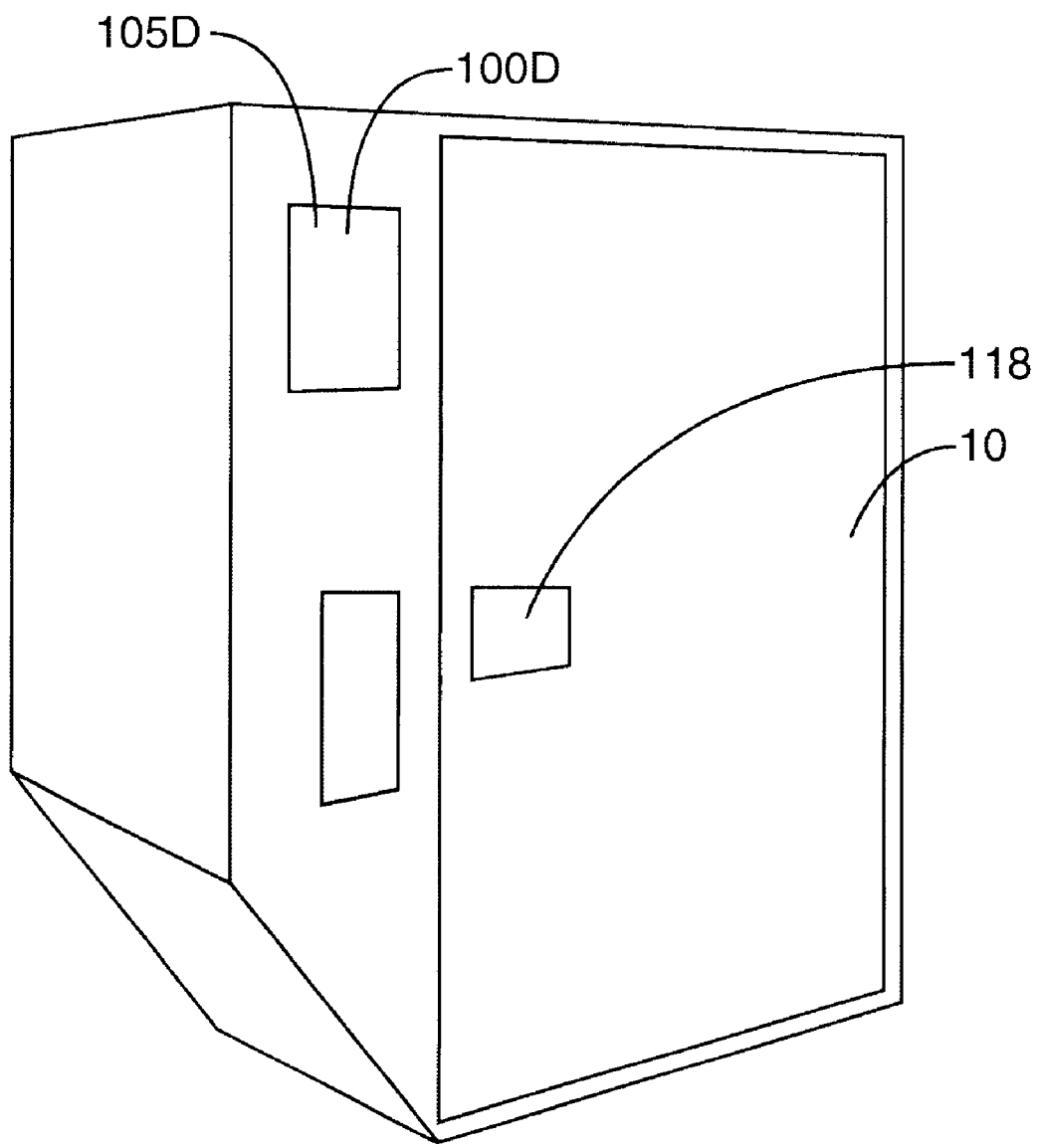
FIG. 3 is a perspective view of a field-emitting tracking device associated with a container designed for the cargo hold of an aircraft transportation vessel.

FIG. 3 illustrates another type of electronic device 100 that may be used in accordance with the present invention. A container 10 is provided that is especially suited for the cargo hold of a transportation vessel. An electronic device 100 containing a field-emitting device 105, in the form of a tracking device 117, is associated with the container 10 for determining its geographic position during the shipping process. The tracking device 117 may be placed internally within the electronic device 100 or the tracking device 117 may be placed on the container 10 and/or an outer surface of the container 10 and/or associated with the electronic device 100. The tracking device 117 is placed in a position such that it will not interfere with or be damaged by the material handling system, generally designated 40.

Figure 4:
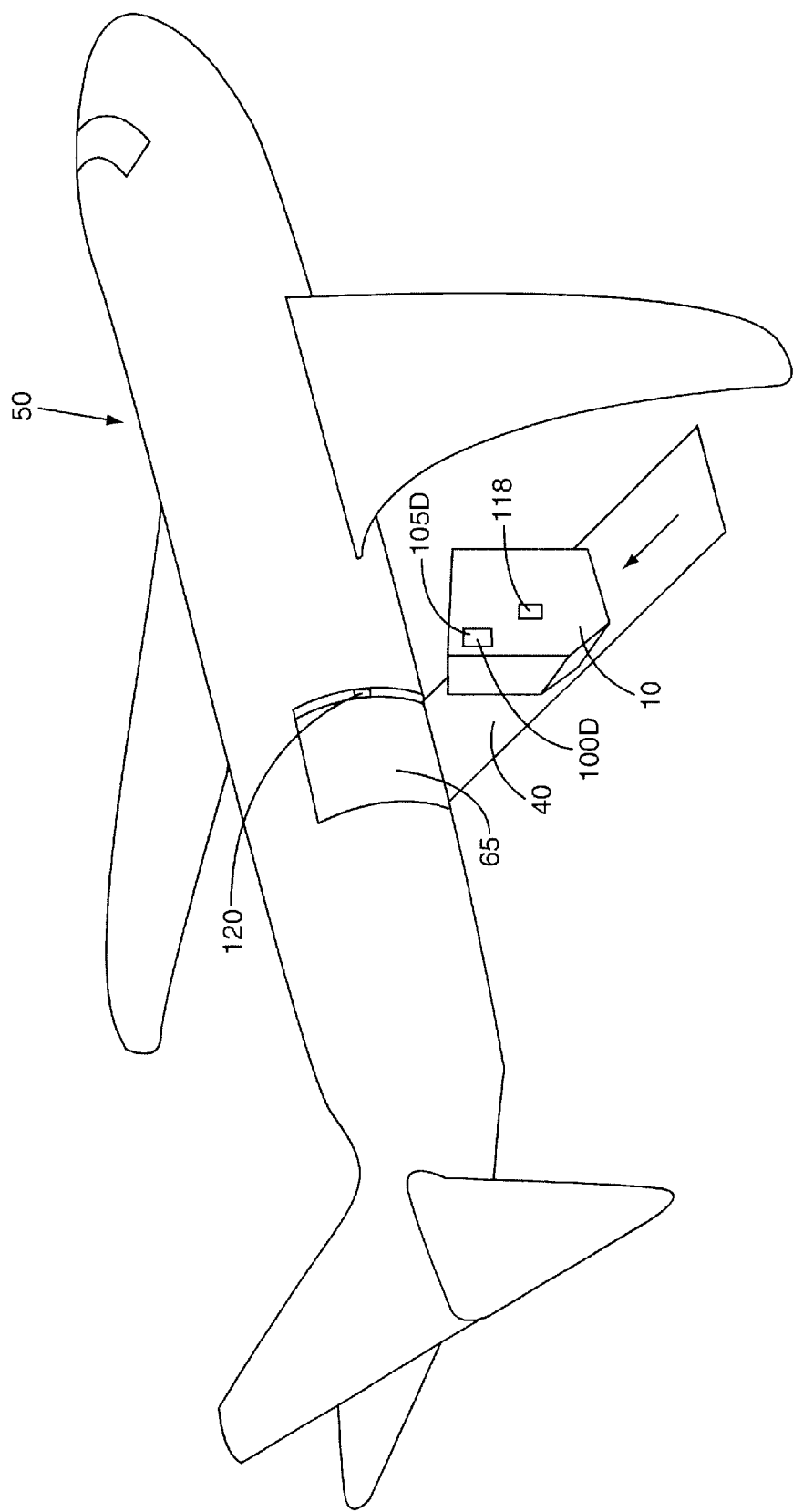
FIG. 4 is a partial perspective view illustrating a container being loaded into the cargo hold of an aircraft transportation vessel.

The container 10 may take a variety of forms depending upon the type of materials and goods being shipped. The container 10 may also be constructed to provide for temperature sensitive materials that range from insulated packaging, refrigeration units using dry ice, and/or thermostat equipped containers using aircraft power to run refrigeration and heating systems. FIG. 4 illustrates the container 10 being loaded into the loading port 65 of an aircraft transportation vessel 50. The container 10 is equipped to be handled by a material handling system 40, and the container 10 may include openings for mounting the blades of a forklift or a protective outer layer allowing for moving the container 10 into the aircraft transportation vessel 50. One skilled in the art will understand that there are many different types of containers 10 and many different types of transportation vessels, such as aircraft transportation vessel 50, ships, and trains, that are all applicable to the present invention.

Figure 5:
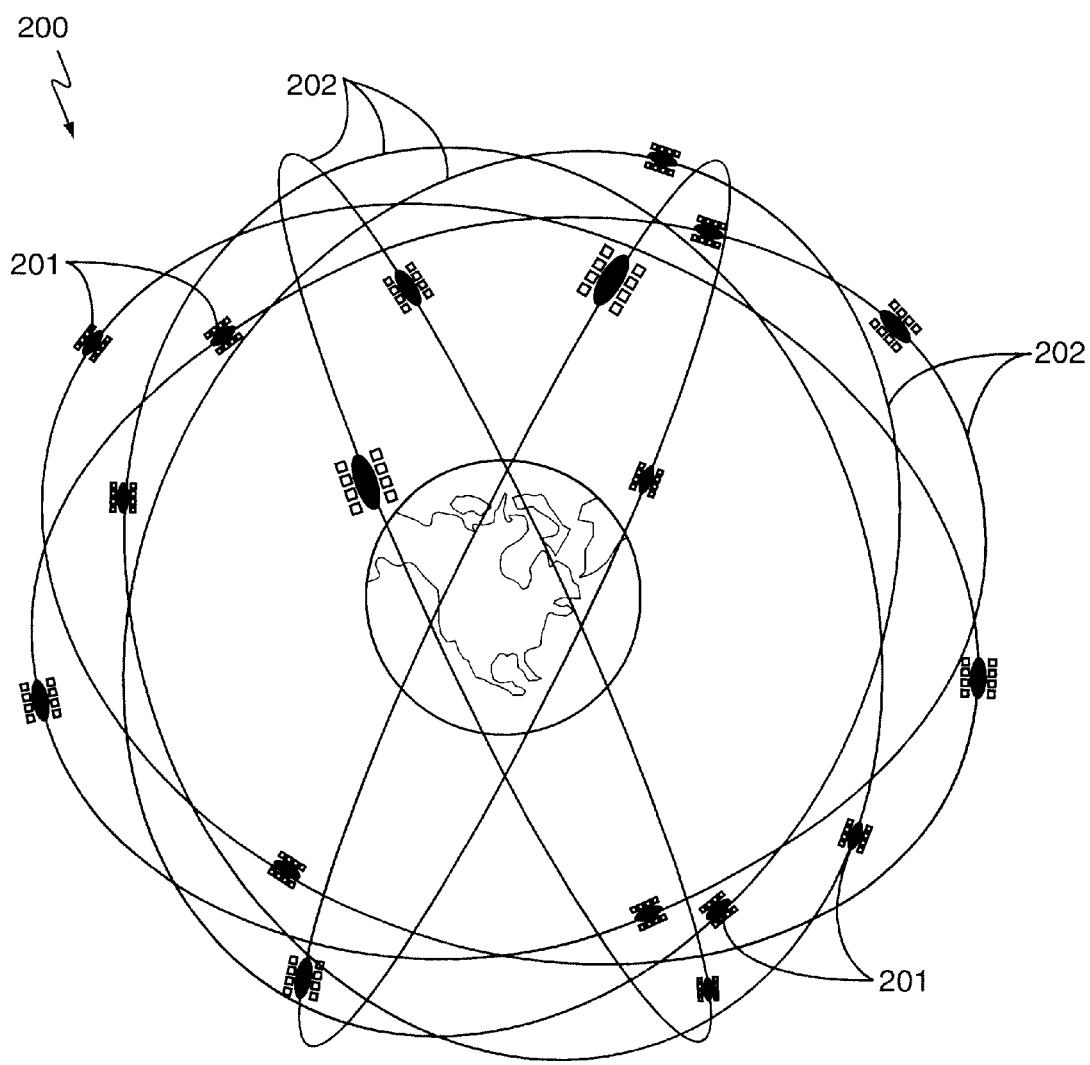
FIG. 5 is a schematic illustration of a global positioning system used by a tracking device to determine the geographic position of a container.

FIG. 5 illustrates one embodiment of a GPS system 200 that communicates with the tracking device 117 so that the electronic device 100 and/or container 10 can determine its position. The GPS system 200 is a space-based radio-positioning network for providing users equipped with suitable receivers with highly accurate position, velocity, and time (PVT) information. The illustrated space-based embodiment of the GPS system 200 includes a constellation of GPS satellites 201 in non-geosynchronous twelve-hour orbits around the earth. The GPS satellites 201 are located in six orbital planes 202 with four of the GPS satellites 201 in each plane, plus a number of "on orbit" spare satellites (not shown) for redundancy.

GPS position determination is based upon a concept referred to as time of arrival (TOA) ranging. Each of the orbiting GPS satellites 201 broadcasts spread spectrum microwave signals encoded with positioning data and satellite ephemeris information. The signals are broadcast on two essential frequencies at precisely known times and at precisely known intervals. The signals are encoded with their precise time of transmission.

The GPS receiver 117 is designed to time the signals and demodulates the GPS satellite 201 orbital data contained in the signals. Using the orbital data, the GPS receiver 117 determines the time between transmission of the signal by the GPS satellite 201 and reception by the GPS receiver 117. Multiplying this by the speed of light gives what is termed the "pseudo range measurement" of that satellite. If a clock within the GPS receiver 117 were perfect, this would be the range measurement for that GPS satellite 201, but the imperfection of the clock causes it to differ by the time offset between actual time and receiver time. Thus, the measurement is called a pseudo range, rather than a range. However, the time offset is common to the pseudo range measurements of all the satellites 201. By determining the pseudo ranges of four or more GPS satellites 201, the GPS receiver 117 is able to determine its location in three dimensions, as well as the time offset. Thus, an electronic device 100 equipped with a proper GPS receiver 117 is able to determine its PVT with great accuracy. The GPS receiver 117 of the present embodiment determines positioning information accurately when three or more satellite signals are received, but it is still possible for the GPS receiver 117 to successfully determine location from positioning information from two or less GPS satellites 201. This technology is well known, such as that disclosed in U.S. Pat. No. 6,031,488, entitled "Method and system for an efficient low cost PPS GPS receiver," incorporated herein by reference in its entirety.

Figure 6:
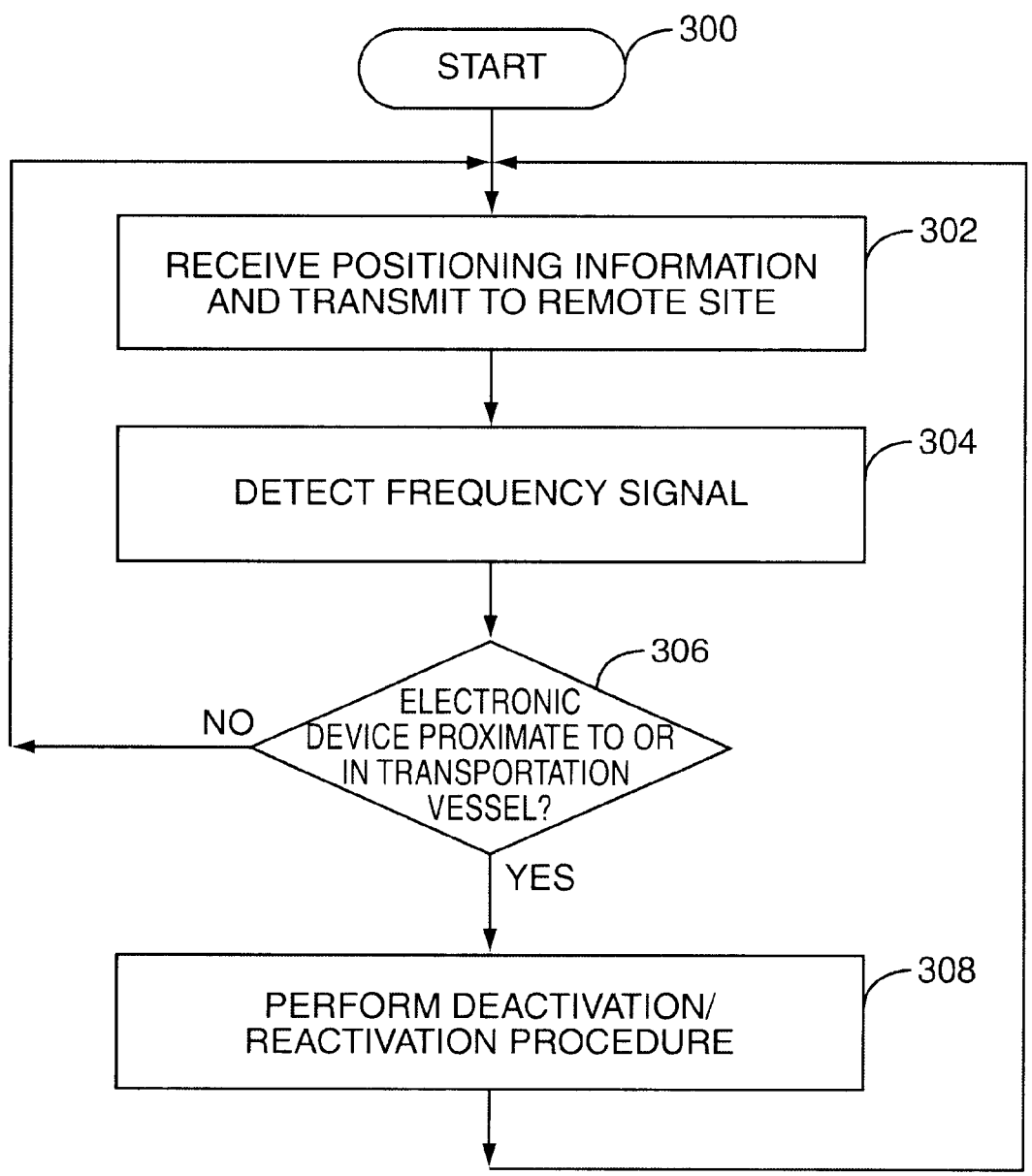
FIG. 6 is a flowchart describing the process of detection of a transportation vessel using a frequency detector.

FIG. 6 illustrates the operation of the present invention when the frequency detector 118 is used to determine if an electronic device 100, having a tracking device 117, associated with an electronic device 100 and/or container 10 is in proximity to the aircraft transportation vessel 50 and/or its cargo hold. The operation starts (step 300) and the tracking device 117 receives the positioning information from the GPS receiver 117 and transmits the positioning information to the remote site 130 (step 302). Next, the control system 101 receives any detected frequency signals present that are received by the frequency detector 118 (step 304). The control system 101 determines, based on the information received from the frequency detector 118, whether the electronic device 100 and/or container 10 is in proximity to an aircraft transportation vessel 50 and/or its cargo hold (decision 306). In the embodiment where the electronic device 100 includes a tracking device 117, if the control system 101 determines that the electronic device 100 and/or container 10 is not in proximity to the aircraft transportation vessel 50 and/or its cargo hold, the process is repeated (step 302). In an embodiment where the electronic device 100 does not include a tracking device 117, if the control system 101 determines that the electronic device 100 is not in proximity to a transportation vessel and/or its cargo hold, the process simply returns to the beginning (step 300) and the process is repeated.

If the control system 101 determines that the electronic device 100 and/or container 10 is in proximity to the aircraft transportation vessel 50 and/or its cargo hold, the control system 101 performs a deactivation and reactivation procedure for its field-emitting device(s) 105 and/or any other systems desired (step 308). When the reactivation process is completed, the process returns back to the beginning (step 300) and the process is repeated. Note that while the above description is directed towards an electronic device 100 associated with an electronic device 100 and/or container 10 loaded onto an aircraft transportation vessel 50, the above description, notwithstanding step 302, could also be used for any type of electronic device 100, including those described in FIGS. 2A, 2B, and 2C, for example.

Figure 7:
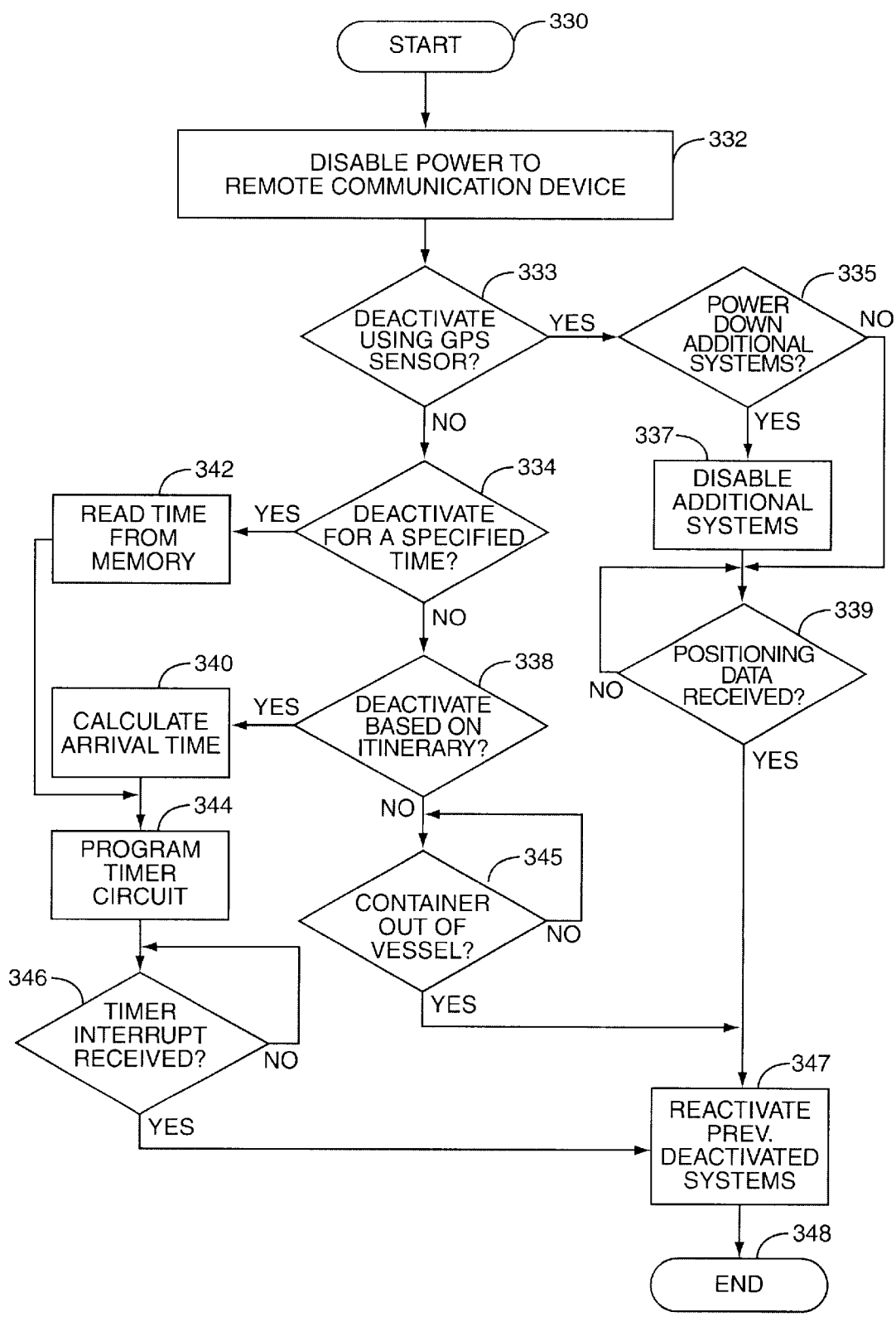
FIG. 7 is a flowchart describing the deactivation and reactivation processes of the control system in the electronic device.

FIG. 7 describes the deactivation/reactivation procedure of the tracking system (step 308) illustrated in FIG. 6 for an embodiment where the electronic device 100 includes a tracking device 117. In the present invention, the term "deactivation" and the like are defined as disabling the systems and elements of the tracking device 117 that may cause interference. Deactivation may be disabling or de-coupling power from the field-emitting device 105 and/or the systems and components of the electronic device 100, reducing power to systems and components of the electronic device 100, and/or disabling or de-coupling power from the communication systems components of the electronic device 100.

The deactivation process begins (step 330), and the control system 101 controls the power system 110 and disables or decouples power to the field-emitting device(s) 105 (step 332). The control system 101 then determines if the field-emitting device(s) 105 has been disabled due to lack of reception of positioning information signals from the GPS receiver 117 (decision 333). If yes, the control system 101 reads memory 104 to determine if any additional systems in the electronic device 100 should be disabled (decision 335), and such disabling is carried out if programmed (step 337).

The control system 101 then continually checks to see if positioning information has been received by the GPS receiver 117 until positioning information signals are received (decision 339). The electronic device 100 is able to perform this function since the deactivation process does not deactivate the GPS receiver 117. When positioning information is received successfully again by the GPS receiver 117, the electronic device 100 is reactivated and resumes the transmission of positioning information concerning the location of the electronic device 100 and/or container 10 to the remote site 130 (step 347). The process ends (step 348), and the process returns back to FIG. 6 (step 308).

If the control system 101 determines that deactivation was not a result of the remote communication device 112 failing to receive positioning information signals from the GPS receiver 117 (decision 333), the control system 101 determines if the electronic device 100 is to be disabled for a specified period of time (decision 334). If yes, the control system 101 reads the specified time from memory 104 (step 342) and programs the timer circuit 108 (step 344). The control system 101 waits until the timer circuit 108 indicates the specified time has lapsed (decision 346) before the electronic device 100 reactivates previously deactivated systems in the electronic device 100, including any field-emitting device(s) 105 and the remote communications device 112 (step 347), and ends (step 348), returning back to the process illustrated FIG. 6 (step 308).

If the control system 101 determines that the electronic device 100 and/or any of its subsystems, including the field-emitting device 105, is not to be deactivated for a specified period of time (decision 334), the control system 101 determines if the deactivation period should be based on the itinerary of the electronic device 100 and/or container 10 (decision 338). For instance, the desired period of deactivation may extend until the aircraft transportation vessel 50 is scheduled to land and/or reach its final destination. If the answer to itinerary-based deactivation is yes (decision 338), the control system 101 calculates the arrival time (step 340) and programs the timer circuit 108 (step 344). The control system 101 waits until the timer circuit 108 indicates the arrival time has passed (decision 346) before the electronic device 100 reactivates previously deactivated systems in the electronic device 100, including any field-emitting device(s) 105 and the remote communications device 112 (step 347), and ends (step 348), returning back to the process illustrated in FIG. 6 (step 308).

If the control system 101 determines that the deactivation should not be based on the itinerary of the electronic device 100 and/or container 10 (decision 338), the control system 101 determines if the electronic device 100 and/or container 10 is outside of the transportation vessel (decision 345) by checking status of the frequency detector 118 until the electronic device 100 and/or container 10 is actually outside the aircraft transportation vessel 50, at which time the electronic device 100 reactivates previously deactivated systems in the electronic device 100, including the field-emitting device(s) 105 and the remote communications device 112 (step 347), and ends (step 348), returning back to the process illustrated FIG. 6 (step 308).

Note that the control system 101 may determine to perform the reactivation process based on a combination of events occurring together rather than just relying on one event. The combination of events may include, but is not limited to, expiration of a time, the arrival of the electronic device 100 and/or container 10 at its final destination, and/or the container 10 not being in proximity to a transportation vessel.

During the deactivated state, the control system 101 may deactivate all elements and field-emitting devices 105 and only maintain enough power to periodically detect the electronic device 100 and/or container 10 position and/or its proximity to a transportation vessel. Alternatively, the control system 101 may deactivate only those elements that may interfere with a transportation vessel's systems, such as the field-emitting devices 105, including the remote communication device 112 and the GPS receiver 117, and maintain the activated state for the other components.

Alternatively, the control system 101 may send location information, via a signal, through the remote communication device 112 such that the tracking party will know the last available geographic location prior to deactivation. The control system 101 may also remain in an activated state for a predetermined period of time until deactivation. The predetermined period of time provides for the assumption that the container 10 will be placed onto the aircraft transportation vessel 50 some time before takeoff and that there will be spare time in which interference with aircraft transportation vessel 50 systems is not an issue.

The electronic device 100 is configured to determine if it is in proximity to a transportation vessel, such as an aircraft transportation vessel 50, by detecting frequencies emitted by a transportation vessel during its normal operation. An aircraft transportation vessel 50 with jet engines, for example, may produce specific frequencies during operations, such as take off, landing, taxiing, and preflight checks. Detection of the electronic device 100 in the aircraft may be accomplished by detecting specific emitted frequencies that are unique to a transportation vessel.

Figure 8:
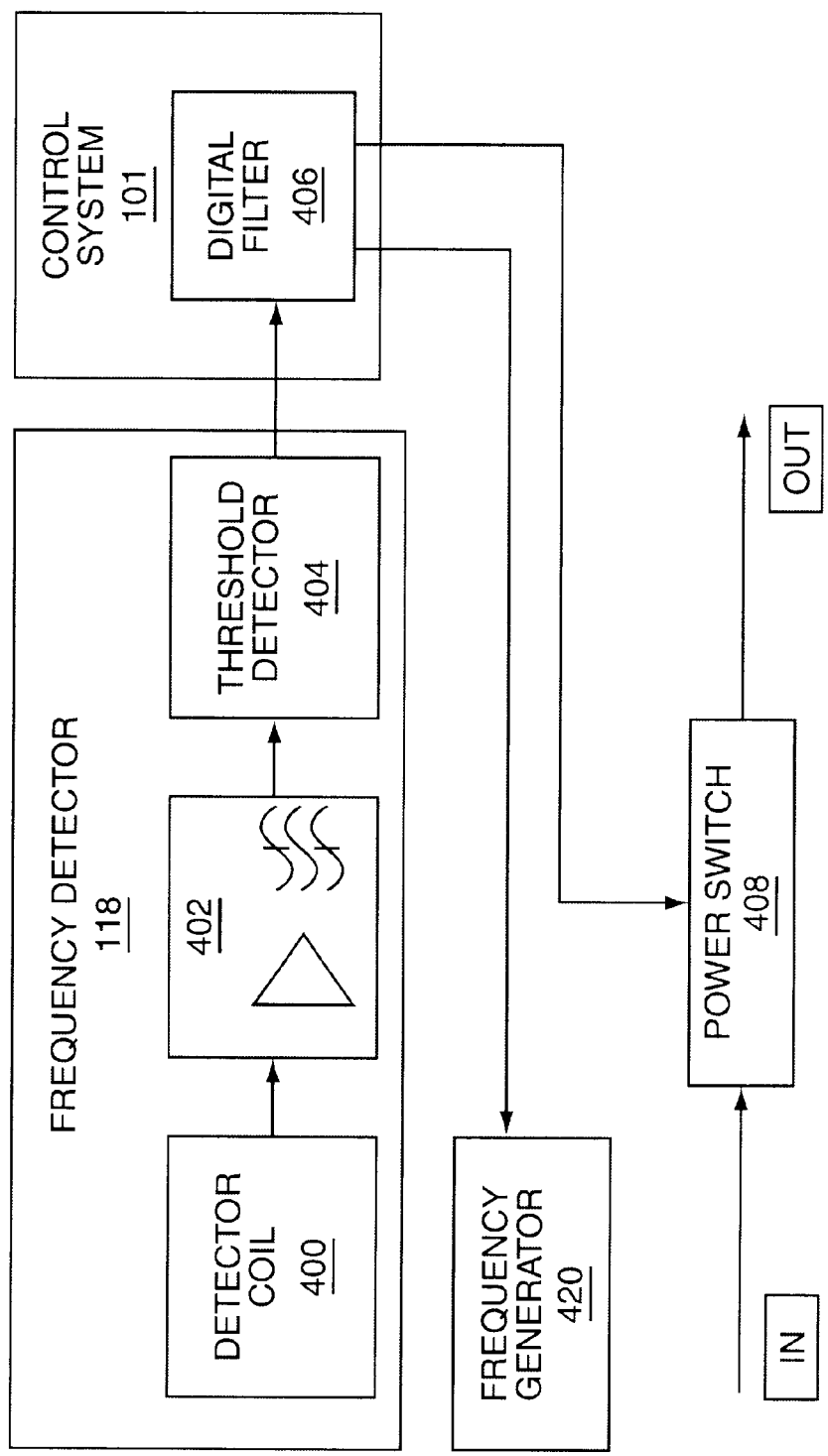
FIG. 8 is a schematic illustration of a frequency detector with the self-checking frequency generator.

FIG. 8 illustrates a frequency detector 118, according to one embodiment of the present invention, for detecting a signal in the range of 400 Hz. Aircraft power systems, for example, use an AC 400 Hz power distribution system that is somewhat unique to aircraft transportation vessel 50, as described in U.S. Pat. No. 5,835,322, entitled "Ground fault internet circuit apparatus for 400 Hz aircraft electrical systems," incorporated herein by reference in its entirety. A frequency detector 118 that detects a signal at approximately 400 Hz may be used to indicate that the electronic device 100 is in proximity to a transportation vessel and that the field-emitting devices 105 associated with the electronic device 100 that emits an electric, magnetic, or electromagnetic field that could potentially interfere with the transportation vessel be deactivated in accordance with the deactivation process discussed above and illustrated in FIG. 7.

When the 400 Hz signal is detected by the control system 101, as illustrated in FIG. 8, the control system 101 causes a power switch 408 coupled to the control system 101 to disconnect power from the power system 110 to portions of the electronic device 100 and/or the other field-emitting devices 105 associated with the electronic system 100. The frequency detector 118 is comprised of a detector coil 400 that is broadly tuned to receive a 400 Hz frequency signal using a capacitor. The detector coil 400 is coupled to an amplifier and filter 402 so that a frequency signal received through the detector coil 400 is passed to the amplifier and filter 402. The amplifier and filter 402 conditions the frequency signal by amplifying the low frequency noise in the frequency signal and band limiting the frequency response to the 400 Hz frequency region. In this manner, other frequencies not of interest, such as 50 Hz or 60 Hz used in other power systems, are not detected and passed through to the control system 101.

The amplifier and filter 402 next passes the conditioned signal to a threshold detector 404. The threshold detector 404 passes the frequency signal through to the control system 101 if it has a level above a reference threshold value. The threshold level may be based on total energy or voltage and/or current, individually. The threshold value is selected so that detected frequency signals not exceeding the threshold value are not passed along to the control system 101 to indicate the proximity of a transportation vessel. The threshold detector 404 may be comprised of a rectifier and low pass filter or integrator that provides a voltage in proportion to the level of the incoming frequency signal.

If the frequency signal is above the threshold value, it is passed to a digital filter 406 in the control system 101 to smooth the frequency signal so that it may be input into a power switch 408 to control the power system 110. The power switch 408 may be a digital switch that generates a true and false condition, including but not limited to, a CMOS transistor or other on-off circuitry that is controlled by an input signal. The default condition of the power switch 408 is isolated so that any failure of the modules in the power system 110 is isolated from the components of the tracking device 117 that are powered using the power system 110.

The frequency detector 118 also contains a self-checking 400 Hz frequency generator 420. In this embodiment, the 400 Hz frequency generator 420 is also coupled to the digital filter 406 and under control of the control system 101. The frequency generator 420 is also magnetically coupled to the detector coil 400. Periodically, the frequency generator 420 is activated by the control system 101 to emit a 400 Hz frequency signal. If the frequency detector 118 is operating properly, the frequency detector 118 will detect the 400 Hz frequency signal emitted by the frequency generator 420. The control system 101 will receive the frequency signal emitted by the frequency generator 420 after it is passed through the frequency detector 118 with minimal delay. In this manner, the control system 101 is able to determine that the frequency detector 118 is operating properly by detecting a frequency signal received from the frequency detector 118 that the control system 101 caused to be emitted by the frequency generator 420. If the control system 101 does not receive the frequency signal emitted by the frequency generator 420 from the frequency detector 118, the control system 101 will know that the frequency detector 118 is not operating properly. The control system 101 may then emit an audio or visual alarm or communicate this error through the remote communication device 112 to the remote site 130 and/or the local access port 122 if such communication will not interfere with a transportation vessel and/or its systems. If such communication would potentially interfere with a transportation vessel and/or its systems, the control system 101 may simply record the error in memory 104 and wait for operator interaction before communicating such error to the remote communication device 112 so that the operator can ensure that such communication would not interfere with the transportation vessel.

The control system 101 may control the frequency generator 420 to generate a frequency signal to check the proper operation of the frequency detector 118 in a number of ways. In one embodiment, the control system 101 sets a timer. The control system 101 polls the count of the timer to determine if the timer has expired. When the timer expires, the control system 101 causes the frequency generator 420 to generate a frequency signal. In another embodiment, the control system 101 may be configured so that the timer is coupled to an interrupt on the control system 101 or circuitry coupled to the control system 101 so that a state change is detected. In this manner, the control system 101 executes an interrupt service routine or other circuitry when the state change is detected indicative of the timer expiration.

The control system 101 may also be configured to reactivate the electronic device 100 and/or field-emitting device (s) 105 associated with the electronic device 100 when the frequency detector 118 no longer detects the frequency signal indicative of the proximity of a transportation vessel. Once the control system 101 detects the lack of receipt of the frequency signal from the frequency detector 118, the control system 101 will cause the frequency generator 420 to emit a frequency signal to be picked up by the frequency detector 118 to ensure that the lack of receipt of the frequency signal is not due to an inoperable frequency detector 118. If the control system 101 receives the frequency signal generated by the frequency generator 420, the control system 101 will know that the frequency detector 118 is operating properly and that the lack of receipt of a frequency signal previously from the frequency detector 118 is due to the electronic device 100 and/or container 10 not being in proximity to a transportation vessel. In this case, the control system 101 reactivates the tracking device 117 and/or other field-emitting devices 105 associated with the electronic device 100.

Figure 9:
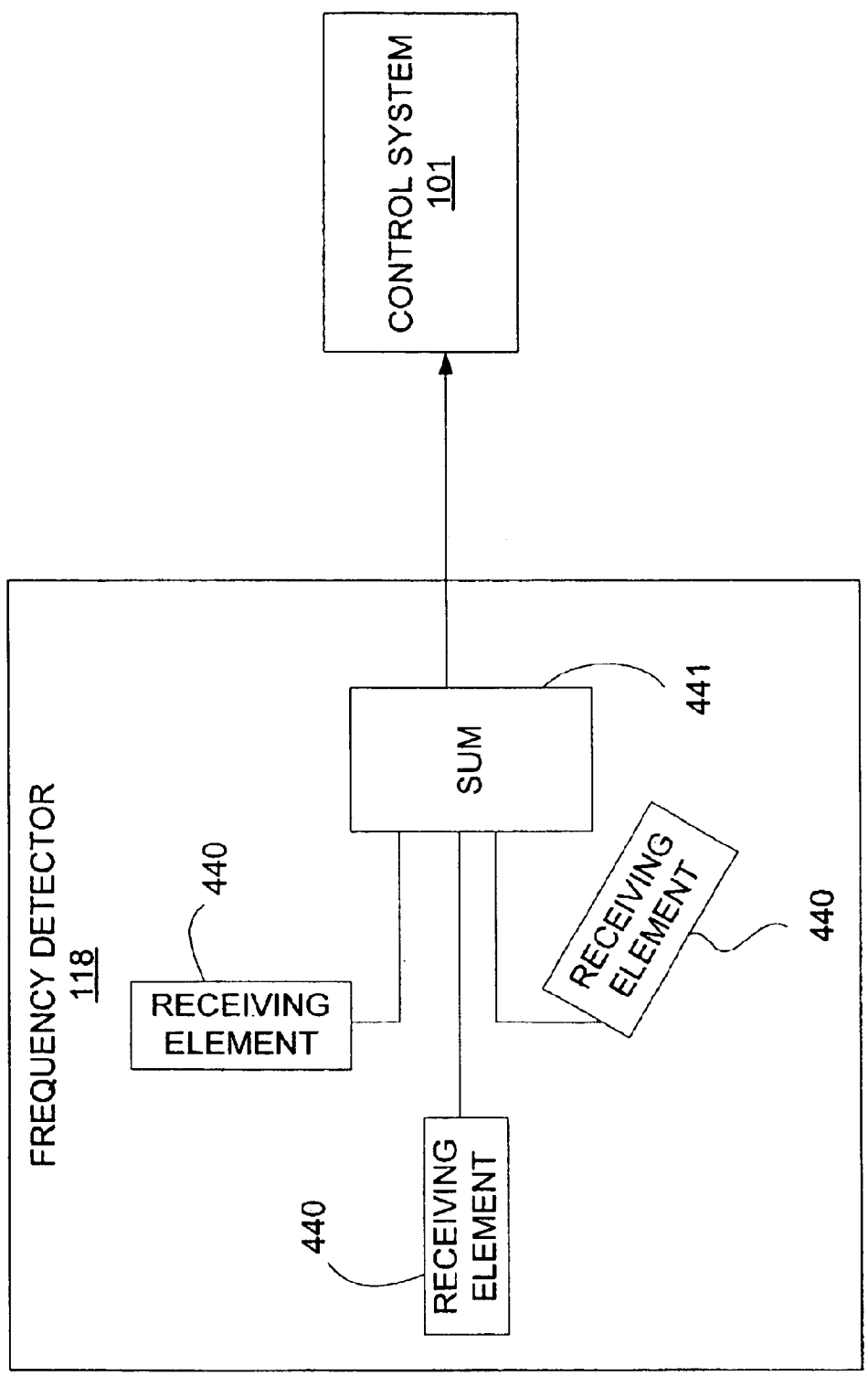
FIG. 9 is a schematic illustration of a frequency detector having orthogonal antennas.

FIG. 9 illustrates a variation of the frequency detector 118 illustrated in FIG. 8 so that the frequency detector 118 is capable of receiving signals independent of its orientation. The frequency detector 118 includes three receiving elements 440 orthogonal to each other in three dimensions for use as the frequency detector 118. The receiving elements 440 may be coils with tuned circuits to detect the desired frequency, or magnetometers designed to sensitively measure AC field strengths.

The purpose of including more than one receiving element 440 and placing a plurality of receiving elements 440 orthogonal to each other is to create an orientation-independent receiving structure to ensure that signals are picked up regardless of the orientation of the electronic device 100 and/or the frequency detector 118. In one embodiment, three receiving elements 440 are placed orthogonally to each other in three different planes to create detection devices in three different dimensions. A summer 441 sums the squares of the signal patterns from the receiving elements 440 to eliminate any nulls. In this manner, there is always a signal generated from at least one receiving element 440 that is not null, thereby making the frequency detector 118 independent of orientation.

The summed signals from the summer 441 are received by the control system 101. If the control system 101 detects a significant signal from the receiving elements 440 that are tuned to receive 400 Hz signals, the control system 101 is programmed to recognize that the electronic device 100 is in proximity to a transportation vessel and to perform the deactivation procedure. The summer 441 may also be contained inside of the control system 101 rather than a separate device from the control system 101.

A spectrum analyzer may also be used as a frequency detector 118 to determine the presence of a particular frequency signal in a manner such as described in U.S. Pat. No. 3,418,574, entitled "Spectrum analyzer using limited operating frequency bandwidth," incorporated herein by reference in its entirety. The spectrum analyzer scans a band of signal frequencies in order to determine the frequency spectrum of any signal emitted by a transportation vessel, such as an aircraft transportation vessel 50. There are other methods of detecting particular frequency signals so as to provide a frequency detector 118, and the preferred embodiments are not intended to limit the present invention from using such other methods.

It is also noted that other frequency signals may be emitted when the electronic device 100 is in proximity to a transportation vessel, such as an aircraft transportation vessel 50 at an aircraft field. Aircraft towers or other communication devices may emit FM signals that can be detected by the frequency detector 118 to indicate that the electronic device 100 is either in proximity to an aircraft transportation vessel 50 such that the deactivation process should be performed. Capacitive signals that are in an electric field may be emitted when the electronic device 100 is in proximity to an aircraft transportation vessel 50. Therefore, the present invention is not limited to detection of any frequency detector 118 and/or specific frequency signals and the signals do not necessarily have to be emitted from the aircraft transportation vessel 50 itself.

A frequency beacon 120 may also be used with the present invention to detect a transportation vessel. A frequency beacon 120 is a cooperative device that is purposefully placed in proximity to a transportation vessel to emit a frequency signal to be detected by the frequency detector 118. A frequency beacon 120 may be desirable if the transportation vessel does not emit a specific frequency signal that can be uniquely detected by the frequency detector 118 to indicate the proximity of a transportation vessel. For example, and as illustrated in FIG. 4, a frequency beacon 120 may be positioned immediately within or in proximity to the aircraft loading port 65. The frequency beacon 120 may be positioned on an outer portion of the electronic device 100, but may also be placed slightly away from or in proximity to the transportation vessel so that the frequency signal emitted by the frequency beacon 120 may be detected by the frequency detector 118 before the electronic device 100 is loaded into the aircraft transportation vessel 50.

The frequency beacon 120 may be configured to emit a frequency signal that is the same that is naturally emitted by a transportation vessel. In this manner, the frequency detector 118 will be capable of detecting a frequency signal indicative of the proximity of a transportation vessel from either the transportation vessel itself, the frequency beacon 120, or both. The control system 101 may deactivate if the frequency detector 118 detects one of the frequency signals from either a transportation vessel and/or the frequency beacon 120. This particular configuration adds an extra measure of reliability and accuracy since the frequency detector 118 is capable of detecting the proximity of a transportation vessel in two independent methods.

However, note that a frequency beacon 120 may be used that does not emit the same frequencies as those naturally emitted by a transportation vessel and/or its systems so long as the frequency detector 118 is capable of detecting a frequency signal emitted by the frequency beacon 120. If the frequency of the signal emitted by a transportation vessel is different from the frequency of the signal emitted by the frequency beacon 120, the control system 101 may be configured to require the presence of both signals of different frequencies before any deactivation occurs.

In another embodiment, the control system 101 determines if the frequency detector 118 is becoming or is de-tuned due to a change or failure in one of its components. Depending on the particular change or failure in the frequency detector 118, the frequency detector 118 may still detect signals emitted from the frequency generator 420. However, the frequency detector 118 may not receive such signals at the designed strength, and at a strength sufficient to pass through the threshold detector 404 and/or surpass the control system's 101 threshold value.

The control system 101 causes the frequency generator 420 to emit a band of frequencies close to the center frequency of the frequency detector 118 during the self-checking process. The control system 101 then determines the reception strength and noise level received by the frequency detector 118 for each of the frequencies in the band, like the configuration illustrated in FIG. 8. If the control system 101 determines that the frequency detector 118 is not detecting the desired frequency at the correct threshold value or strength, the control system 101 can adjust the threshold detector 404 and/or its settings in memory 104 so that the control system 101 properly receives an indication that the frequency detector 118 received a frequency signal even though the components and/or tuning of the frequency detector 118 may have been altered and/or failed over time. If the control system 101 determines that such alteration or failure is significant enough to justify the reporting of an error, the control system 101 may then emit an alarm or communicate this error through the remote communication device 112 to the remote site 130, as previously described.

In another embodiment, the frequency detector 118 contains a phase-locked-loop (PLL) circuit to indicate reception of a frequency signal indicative of the proximity of a transportation vessel. The threshold detector 404 in the frequency detector 118 is comprised of components to create a PLL circuit. In one embodiment, the threshold detector 404 with PLL circuit is the LMC567 CMOS tone decoder. Use of a PLL circuit ensures that the frequency detector 118 first determines that the frequency signal received from the detector coil 400 is substantially the same in frequency and phase over a given period of time, known as a "locked" condition, before the frequency detector 118 outputs a signal to the digital filter 406 indicating that a frequency signal has been detected indicative of the proximity of a transportation vessel.

A basic PLL circuit includes a phase and frequency detector that compares the phase of a reference signal received the detector coil 400 to a voltage-controlled oscillator (VCO). The VCO generated by an output of the phase and frequency detector is a signal in proportion to the phase difference of the reference signal and the output of the VCO. The direct current component of this output signal is used as the input voltage for the VCO. The output of the VCO is fed back to the phase and frequency detector for comparison to the reference signal that in turn controls the VCO frequency to minimize the phase difference. Therefore, the frequency and the phase of the reference signal and the VCO signal are made the same by this negative feedback indicative of a "locked" condition if the reference signal does not wander.

Figure 10:
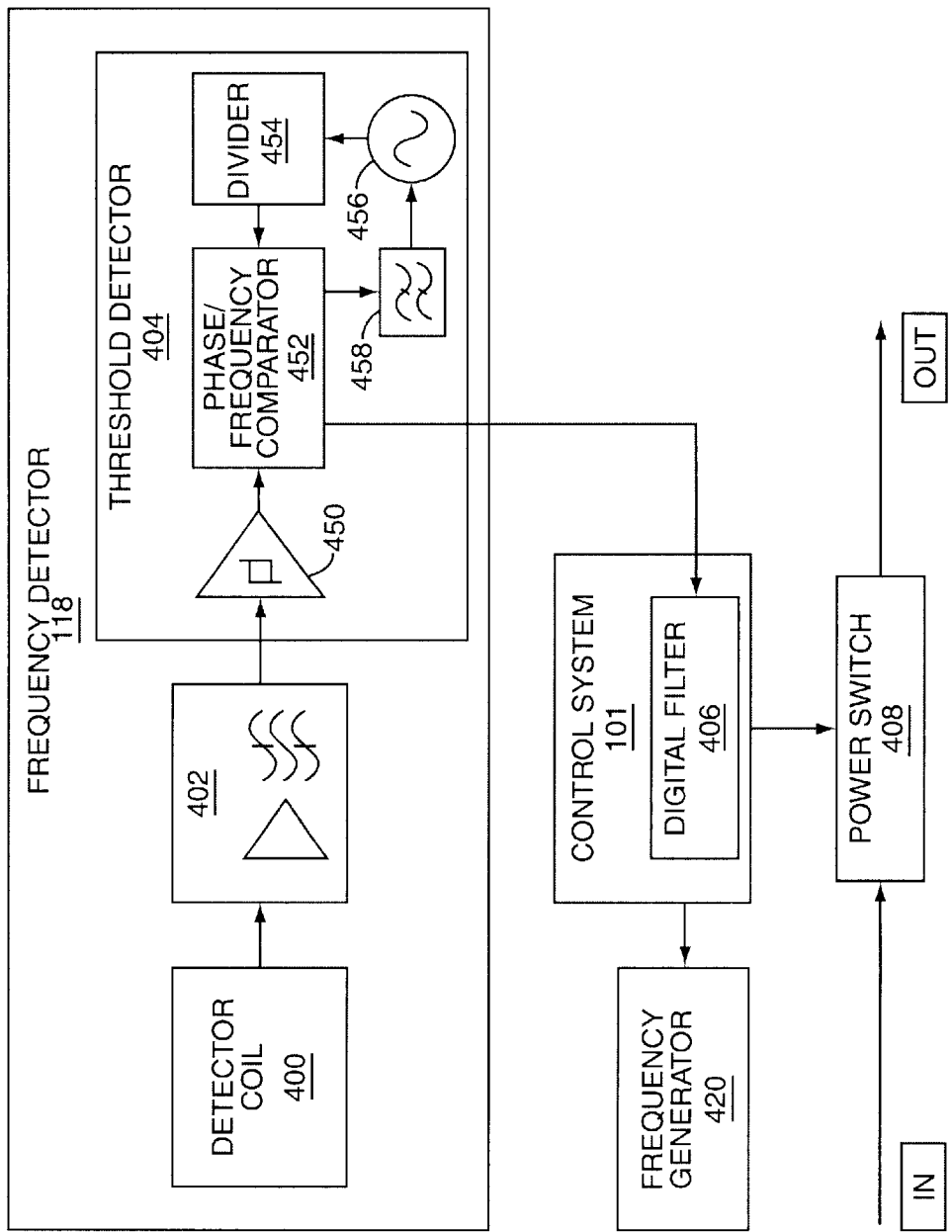
FIG. 10 is a schematic illustration of a frequency detector with a self-checking frequency generator employing a phase-locked-loop circuit.

As illustrated in FIG. 10, the frequency signal is detected by the detector coil 400 and passes through the amplifier and filter 402. The frequency signal is converted into a logic signal by the converter 450 and is input into the phase and frequency comparator 452. The phase and frequency comparator 452 also contains an integrated output that generates a frequency signal that is filtered by a filter 458 and is input into a voltage-controlled oscillator (VCO) 456. The signal from the VCO 456 is divided by two by a frequency divider 454 and then input back into the phase and frequency comparator 452. The VCO 456 operates at twice the input frequency to avoid radiation from the VCO 456 blocking the input sensitivity of the phase and frequency comparator 452, but the VCO 456 could be designed to operate at one times the input frequency without need for the frequency divider 454. The VCO 456 could also be designed to operate at any factor times the input frequency so long as an appropriate frequency divider 454 is used.

When a frequency signal indicative of the proximity of a transportation vessel is received and when an adequate signal-to-noise ratio inside the integration time of the filter 458 is received, the VCO 456 moves into a phase-locked condition. When the phase and frequency comparator 452 detects the locked condition, it outputs a signal to the digital filter 406 to indicate that the frequency detector 118 has detected a signal indicative of the proximity of a transportation vessel.

Certain modifications and improvements will occur to those skilled in the art upon a reading of the foregoing description. Note that the invention may be carried out in any type of electronic device 100 for detecting the proximity of any type of transportation vessel and deactivating and/or decoupling power to any type of field-emitting device 105 associated with the electronic device 100. It should be understood that the present invention is not limited to any particular type of component including but not limited to the container 10, a transportation vessel, including the aircraft transportation vessel 50, the electronic device 100 and its components, including but not limited to the field-emitting device(s) 105, the frequency detector 118, the frequency beacon 120, and the frequency generator 420. For the purposes of this application, couple, coupled, or coupling is defined as either a direct connection or a reactive coupling. Reactive coupling is defined as either capacitive or inductive coupling.

One of ordinary skill in the art will recognize that there are different manners in which these elements can accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

What is claimed is:

1. An apparatus, comprising:
   a tracking device configured to transmit and receive positioning information to a remote site over a wireless communications link, the tracking device including a power source for supplying power to the tracking device;
   a control system;
   a frequency detector coupled to said control system for receiving a frequency signal indicative of the proximity of the transportation vessel, the control system being configured to decrease the power supplied to the tracking device by the power source; and
   a frequency generator coupled to said control system;
   said control system being capable of determining whether said frequency detector is operating properly by causing said frequency generator to emit a self-check signal having a frequency substantially the same as said frequency signal and determining if said self-check signal was received by said frequency detector.

2. The apparatus of claim 1, wherein said frequency detector is comprised from the group consisting of a magnetic sensor and a capacitance sensor.

3. The apparatus of claim 1, wherein said frequency detector further comprises an amplifier that amplifies and filters said frequency signal to remove noise from said frequency signal to form a conditioned frequency signal.

4. The apparatus of claim 3, wherein said conditioned frequency signal is input into a threshold detector and said control system so that said control system is capable of determining if said conditioned frequency signal is above a threshold value indicative of the proximity of the transportation vessel.

5. The electronic device apparatus of claim 1, wherein said frequency signal is input into a threshold detector included in said frequency detector wherein said control system is capable of determining if said frequency signal is above a threshold value indicative of the proximity of the transportation vessel.

6. The apparatus of claim 5, wherein said control system causes said frequency generator to emit a band of frequencies to determine if said frequency detector has become de-tuned or inoperable.

7. The apparatus of claim 6, wherein said control system adjusts said threshold detector if said frequency detector has become de-tuned or inoperable.

8. The electronic device apparatus of claim 1, further comprising a field-emitting device coupled to said control system, said control system being configured to deactivate said field-emitting device when said frequency detector receives said frequency signal.

9. The electronic device apparatus of claim 1, further comprising a field-emitting device coupled to said control system, said control system being configured to reduce the power in said field-emitting device when said frequency detector receives said frequency signal.

10. The apparatus of claim 1, further comprising a field-emitting device coupled to said control system, said control system being configured to decouple the power in said field-emitting device when said frequency detector receives said frequency signal.

11. The apparatus of claim 1, wherein said frequency detector comprises three antennas positioned in three different dimensions with respect to each other that are capable of receiving said frequency signal so that said frequency detector is capable of detecting said frequency signal regardless of the orientation of said frequency detector.

12. The apparatus of claim 11, wherein said frequency detector further comprises a summer that sums said frequency signals received by said antennas.

13. The apparatus of claim 1, wherein said control system is comprised from the group consisting of a microprocessor, a micro-controller, a switch, and a transistor.

14. The apparatus of claim 1, wherein said frequency detector is comprised of coils and a tuned circuit to determine the presence of said frequency signal.

15. The apparatus of claim 1, wherein said frequency signal is comprised of a frequency of around about 400 Hz.

16. The apparatus of claim 1, wherein said control system causes said frequency generator to emit a band of frequencies to determine if said frequency detector has become de-tuned or inoperable.

17. The apparatus of claim 16, wherein said control system reports an error to a remote site if said frequency detector has become de-tuned or inoperable.

18. The apparatus of claim 1, wherein said frequency detector comprises a PLL circuit to detect said frequency signal and to generate a signal to said control system indicative of the locked condition of said frequency signal indicative of the proximity of the transportation vessel.

19. The apparatus of claim 18, wherein said PLL circuit comprises:
   a converter to receive said frequency signal;
   a phase and frequency comparator to receive an output signal from said converter; and a filter and VCO that receives an output signal from said phase and frequency comparator indicative of the difference in phase between said frequency signal and said VCO;

said VCO generates an output signal that is fed back into said phase and frequency comparator.

20. The apparatus of claim 1, wherein said control system is associated with a device from the group consisting of a cellular phone, a PDA, a laptop computer, and an apparatus associated with a shipping container.

21. An apparatus for sensing the proximity of an intrinsically-safe area, comprising:

a tracking device configured to transmit and receive positioning information over a wireless communications link to a remote site;

a power source for supplying power to the tracking device;

a frequency detector coupled to said control system for receiving a frequency signal indicative of the proximity of the intrinsically-safe area;

a control system configured to decrease the power supplied to the tracking device in response to the received frequency signal; and a frequency generator coupled to said control system;

said control system being capable of determining whether said frequency detector is operating properly by causing said frequency generator to emit a self-check signal having a frequency substantially the same as said frequency signal and determining if said self-check signal was received by said frequency detector.

22. The apparatus of claim 21, wherein said frequency detector is comprised from the group consisting of a magnetic sensor and a capacitance sensor.

23. The apparatus of claim 21, wherein said frequency detector further comprises an amplifier that amplifies and filters said frequency signal to remove noise from said frequency signal to form a conditioned frequency signal.

24. The apparatus of claim 23, wherein said conditioned frequency signal is input into a threshold detector and said control system so that said control system is capable of determining if said conditioned frequency signal is above a threshold value indicative of the proximity of the intrinsically-safe area.

25. The apparatus of claim 21, wherein said frequency signal is input into a threshold detector included in said frequency detector wherein said control system is capable of determining if said frequency signal is above a threshold value indicative of the proximity of the intrinsically-safe area.

26. The apparatus of claim 25, wherein said control system causes said frequency generator to emit a band of frequencies to determine if said frequency detector has become dc-tuned or inoperable.

27. The apparatus of claim 26, wherein said control system adjusts said threshold detector is said frequency detector has become de-tuned or inoperable.

28. The apparatus of claim 21, further comprising a field-emitting device coupled to said control system wherein said control system deactivates said field-emitting device when said frequency detector receives said frequency signal.

29. The apparatus of claim 21, further comprising a field-emitting device coupled to said control system wherein said control system reduces the power in said field-emitting device when said frequency detector receives said frequency signal.

30. The apparatus of claim 21, further comprising a field-emitting device coupled to said control system wherein said control system decouples the power in said field-emitting device when said frequency detector receives said frequency signal.

31. The apparatus of claim 21, wherein said frequency detector comprises three antennas positioned in three different dimensions with respect to each other that are capable of receiving said frequency signal so that said frequency detector is capable of detecting said frequency signal regardless of the orientation of said frequency detector.

32. The apparatus of claim 31, wherein said frequency detector further comprises a summer that sums said frequency signals received by said antennas.

33. The apparatus of claim 21, wherein said control system is comprised from the group consisting of a microprocessor, a micro-controller, a switch, and a transistor.

34. The apparatus of claim 21, wherein said frequency detector is comprised of coils and a tuned circuit to determine the presence of said frequency signal.

35. The apparatus of claim 21, wherein said frequency signal is comprised of a frequency of around about 400 Hz.

36. The apparatus of claim 21, wherein said control system causes said frequency generator to emit a band of frequencies to determine if said frequency detector has become de-tuned or inoperable.

37. The apparatus of claim 36, wherein said control system reports an error to a remote site if said frequency detector has become de-tuned or inoperable.

38. The apparatus of claim 21 wherein said frequency detector comprises a PLL circuit to detect said frequency signal and to generate a signal to said control system indicative of the locked condition of said frequency signal indicative of the proximity of the intrinsically-safe area.

39. The apparatus of claim 38, wherein said PLL circuit comprises: a converter to receive said frequency signal;

a phase and frequency comparator to receive an output signal from said converter; and a filter and VCO that receives an output signal from said phase and frequency comparator indicative of the difference in phase between said frequency signal and said VCO;

said VCO generates an output signal that is fed back into said phase and frequency comparator.

40. The apparatus of claim 21, wherein said control system is associated with a device from the group consisting of a cellular phone, a PDA, a laptop computer, and an apparatus associated with a shipping container.

41. A transportation vessel detection system, comprising:

an electronic device containing a control system;

a frequency detector coupled to said control system for receiving a frequency signal indicative of when said container is in proximity to the transportation vessel; and a frequency generator coupled to said control system;

a tracking device coupled to said control system, the tracking device being configured to receive positioning information from a positioning system concerning said electronic device and a remote communication device coupled to said control system to transmit said positioning information remotely wherein said control system is adapted to deactivate said remote communication device if said frequency detector detects said frequency signal, said control system being capable of determining whether said frequency detector is operating properly by causing said frequency generator to emit a self-check signal having a frequency substantially the same as said frequency signal and determining if said frequency detector received said self-check signal.

42. The system of claim 41, wherein said frequency detector further comprises an amplifier that amplifies and filters said frequency signal to remove noise from said frequency signal to form a conditioned frequency signal.

43. The system of claim 42, wherein said conditioned frequency signal is input into a threshold detector and said control system so that said control system is capable of determining if said conditioned frequency signal is above a threshold value indicative of the proximity of the transportation vessel.

44. The system of claim 41, wherein said frequency signal is input into a threshold detector included in said frequency detector wherein said control system is capable of determining if said frequency signal is above a threshold value indicative of the proximity of the transportation vessel.

45. The system of claim 44, wherein said frequency beacon is located in proximity to the transportation vessel.

46. The system of claim 44, wherein said control system causes said frequency generator to emit a band of frequencies to determine if said frequency detector has become de-tuned or inoperable.

47. The system of claim 46, wherein said control system adjusts said threshold detector is said frequency detector has become dc-tuned or inoperable.

48. The system of claim 41, further comprising a field-emitting device coupled to said control system wherein said control system deactivates said field-emitting device when said frequency detector receives said frequency signal.

49. The system of claim 41, further comprising a field-emitting device coupled to said control system wherein said control system reduces the power in said field-emitting device when said frequency detector receives said frequency signal.

50. The system of claim 41, further comprising a field-emitting device coupled to said control system wherein said control system decouples the power in said field-emitting device when said frequency detector receives said frequency signal.

51. The system of claim 41, wherein said frequency detector comprises three antennas positioned in three different dimensions with respect to each other so that said frequency detector is capable of detecting said frequency signal regardless of the orientation of said frequency detector.

52. The system of claim 41, wherein said positioning system receives said positioning information from at least one satellite.

53. The system of claim 41, wherein said remote communication device communicates said positioning information remotely to a remote site.

54. The system of claim 41, wherein said remote communication device communicates said position information remotely to a remote site through satellite communications.

55. The system of claim 41, further comprising a power system under control of said control system that deactivates power from said tracking device when said frequency detector detects said frequency signal.

56. The system of claim 41, further comprising a frequency beacon associated with the transportation vessel that emits said frequency signal.

57. The system of claim 56, wherein said frequency beacon is attached to the transportation vessel.

58. The system of claim 41, wherein said control system causes said frequency generator to emit a band of frequencies to determine if said frequency detector has become de-tuned or inoperable.

59. The system of claim 58, wherein said control system reports an error to a remote site if said frequency detector has become de-tuned or inoperable.

60. The system of claim 41, wherein said frequency detector comprises a PLL circuit to detect said frequency signal and to generate a signal to said control system indicative of the locked condition of said frequency signal indicative of the proximity of the transportation vessel.

61. The system of claim 60, wherein said PILL circuit comprises:
  a converter to receive said frequency signal;
  a phase and frequency comparator to receive an output signal from said converter; and
  a filter and VCO that receives an output signal from said phase and frequency comparator indicative of the difference in phase between said frequency signal and said VCO;
  said VCO generates an output signal that is fed back into said phase and frequency comparator.

62. The system of claim 41, wherein said electronic device is comprised from the group consisting of a cellular phone, a PDA, a laptop computer, and a shipping container.

63. A method of verifying that a frequency detector used to detect the proximity of a transportation vessel is operational, comprising the steps of:
  detecting a frequency signal indicative of the proximity of the transportation vessel using a frequency detector;
  reducing power in a tracking device based on the detected frequency signal, the tracking device being configured to receive positioning information over a communications link;
  generating a second signal at substantially the same frequency as said frequency signal; and
  verifying that said frequency detector is operating properly by determining if said frequency detector detected said second signal.

64. The method of claim 63, further comprising determining if said frequency signal is above a threshold value in order to determine the proximity of the transportation vessel.

65. The method of claim 64, further comprising filtering said frequency signal to eliminate any noise in said frequency signal.

66. The method of claims 65, further comprising communicating information to a remote site indicative of the proximity of the transportation vessel.

67. The method of claim 63, wherein said generating a second signal further comprises generating a band of second signals to determine if said frequency detector has become de-tuned or inoperable.

68. The method of claim 64, wherein said generating a second signal further comprises generating a band of second signals to determine if said frequency detector has become de-tuned or inoperable and further comprising adjusting said threshold value if said frequency detector has become de-tuned or inoperable.

69. The method of claim 63, wherein said detecting further comprises determining if said frequency signal is in a locked condition.

70. A method of verifying that a frequency detector used to detect proximity to an intrinsically-safe area, comprising the steps of:
  detecting a frequency signal indicative of the proximity of the intrinsically-safe area using a frequency detector;
  reducing power in a tracking device based on the received frequency signal;

generating a second signal at substantially the same frequency as said frequency signal; and verifying that said frequency detector is operating properly by determining if said frequency detector detected said second signal.

71. The method of claim 70, further comprising determining if said frequency signal is above a threshold value in order to determine the proximity of the transportation vessel.

72. The method of claim 71, further comprising filtering said frequency signal to eliminate any noise in said frequency signal.

73. The method of claim 72, further comprising communicating information to a remote site indicative of the intrinsically-safe area.

74. The method of claim 70, wherein said generating a second signal further comprises generating a band of second signals to determine if said frequency detector has become de-tuned or inoperable.

75. The method of claim 71, wherein said generating a second signal further comprises generating a band of second signals to determine if said frequency detector has become de-tuned or inoperable and further comprising adjusting said threshold value if said frequency detector has become de-tuned or inoperable.

76. The method of claim 70, wherein said detecting further comprises determining if said frequency signal is in a locked condition.

* * * * *